United States Patent
Tyson

(10) Patent No.: US 9,845,390 B1
(45) Date of Patent: Dec. 19, 2017

(54) PROCESS FOR PRODUCING NAPHTHALIMIDE DIESTER FLUORESCENT DYES AND COMPOSITIONS THEREOF

(71) Applicant: Spectronics Corporation, Westbury, NY (US)

(72) Inventor: Daniel Scott Tyson, Avon Lake, OH (US)

(73) Assignee: Spectronics Corporation, Westbury, NY (US)

( * ) Notice: Subject to any disclaimer, the term of this patent is extended or adjusted under 35 U.S.C. 154(b) by 0 days.

(21) Appl. No.: 15/493,461

(22) Filed: Apr. 21, 2017

(51) Int. Cl.
| | |
|---|---|
| C09D 11/50 | (2014.01) |
| C09D 11/06 | (2006.01) |
| C09B 57/08 | (2006.01) |
| C09B 67/40 | (2006.01) |
| G01M 3/20 | (2006.01) |
| C09K 11/06 | (2006.01) |

(52) U.S. Cl.
CPC .......... C09B 57/08 (2013.01); C09B 67/0082 (2013.01); C09K 11/06 (2013.01); G01M 3/20 (2013.01); *C09K 2211/1029* (2013.01)

(58) Field of Classification Search
CPC . C09D 11/50; C09K 11/06; C09K 2211/1029; C09B 57/08; C09B 67/0082; G01M 3/20
USPC ....... 106/31.15, 31.32; 252/301.16; 514/296; 546/100; 73/40.5 R
See application file for complete search history.

(56) References Cited

U.S. PATENT DOCUMENTS

| | | | |
|---|---|---|---|
| 5,858,930 A * | 1/1999 | Desai ............... | C09B 57/08 546/100 |
| 5,918,269 A | 6/1999 | Mahaffey, Jr. | |
| 6,165,384 A * | 12/2000 | Cooper .............. | C09K 11/06 252/301.16 |
| 6,248,890 B1 | 6/2001 | Likavec et al. | |
| 9,617,497 B2 * | 4/2017 | Matsumoto ........... | C09K 5/045 |
| 2015/0045265 A1 * | 2/2015 | Matsumoto ........... | C09K 5/045 508/261 |
| 2016/0266002 A1 * | 9/2016 | Hunt ...................... | G01M 3/22 |

* cited by examiner

*Primary Examiner* — Helene Klemanski
(74) *Attorney, Agent, or Firm* — Drinker Biddle & Reath LLP

(57) ABSTRACT

Provided are processes for producing fluorescent naphthalimide diesters of Formula (I), useful as fluorescent tracer dyes for fluid system leak detection, wherein each of $R^1$ and $R^2$ is, independently of the other, a saturated, linear hydrocarbon chain having from 2 to 10 carbon atoms; and each of $Z^1$ and $Z^2$ is, independently of the other, a fatty acid moiety having a saturated or unsaturated, linear or branched, hydrocarbon chain having from 8 to 24 carbon atoms, and from 0 to 4 double bonds. Also provided are compositions of the aforesaid diesters of Formula (I).

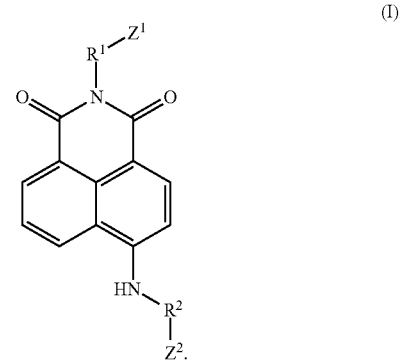

(I)

27 Claims, No Drawings

PROCESS FOR PRODUCING NAPHTHALIMIDE DIESTER FLUORESCENT DYES AND COMPOSITIONS THEREOF

FIELD OF THE INVENTION

The invention relates to fluorescent dyes useful as fluorophores for leak detection in fluid systems.

BACKGROUND OF THE INVENTION

Fluorescent dye additives have been utilized as tracers to detect leaks in fluid systems. The tracer is combined with a system operating fluid such as lubricants, hydraulic fluids, heat transfer fluids, and refrigerants. The dye additive fluoresces when illuminated by suitable light having wavelengths in the rage of 300 to 450 nanometers.

Naphthalimide diester tracer dyes for leak detection are described in U.S. Pat. No. 6,248,890. The dyes are miscible in a variety of polar and non-polar organic liquids such as refrigerant lubricants and refrigerants, mineral oil, polyalkylene glycols, coolants, polyolesters, motor oil, gear oil, transmission fluid, synthetic oils, and polyalphaolefins. They are used to detect fluid system leaks. The naphthalimide diester dyes are highly fluorescent. They possess excellent solution stability during storage and operation, and is stable at high temperatures.

The naphthalimide diester tracer dye compositions described in U.S. Pat. No. 6,248,890 are prepared by esterification of naphthalimide diols with fatty acids. The reaction product mixture inevitably contains substantial levels of unreacted fatty acid. Fatty acid contamination of naphthalimide diester tracer dye leads to corrosion of susceptible fluid system components. Acid-induced chemical degradation of system components can lead to particulate build-up and ultimately restricted flow and clogged systems. High levels of corrosion may lead to structurally weakened parts and equipment, and high failure rates. Unreacted fatty acid must therefore be removed from naphthalimide diol esterification product by further reaction with acid scavenging agents, to reduce the product composition acid number to acceptable levels. Typically, the acid scavenger is an epoxy compound, e.g., a monofunctional or difunctional glycidyl ether or mixtures thereof. The epoxy compound is typically added to the esterification reaction product mixture following reaction of the reactant diol and fatty acid under conditions of elevated temperature which causes excess fatty acid to react with epoxy to form an alcohol. Such reaction conditions include, for example, reaction times from 2-24 hours at temperatures of from 100° C. to 160° C. to react. See U.S. Pat. No. 6,248,890. This further reaction step adds significantly to the cost of fluorescent naphthalimide diester dyes that are to be used as leak detection tracers. Most importantly, significant levels of unreacted fatty acid remain even after treatment with epoxy compounds.

What is needed is a process for producing fluorescent naphthalimide diester dye from naphthalimide diols that avoids contamination by unreacted fatty acid and the need for subsequent scavenger treatment to convert unreacted acid. What is needed is a process for preparing naphthalimide diester dye compositions from naphthalimide diol that avoids or minimizes the use of fatty acid reactants, thereby resulting in a low acid value naphthalimide diester dye composition without subsequent acid scavenging. What is needed is an improved fluorescent naphthalimide diester dye composition that is characterized by not only low crystallinity, but also low acid content, and is also free of acid scavenger reaction products, such as alcohols resulting from the scavenger reaction between fatty acids and epoxy compounds, which provide no useful purpose in naphthalimide diester dye composition.

SUMMARY OF THE INVENTION

In one aspect, a process for preparing a naphthalimide diester of Formula (I) or mixture thereof is provided:

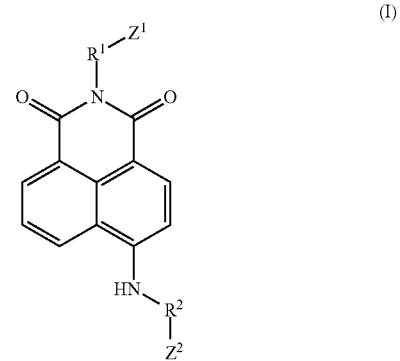

(I)

wherein
each of $R^1$ and $R^2$ is, independently of the other, a saturated, linear hydrocarbon chain having from 2 to 10 carbon atoms;
each of $Z^1$ and $Z^2$ is, independently of the other, a fatty acid moiety having a saturated or unsaturated, linear or branched, hydrocarbon chain having from 8 to 24 carbon atoms, and from 0 to 4 double bonds.

The process comprises:
reacting a naphthalimide diol of Formula (II) or mixture thereof

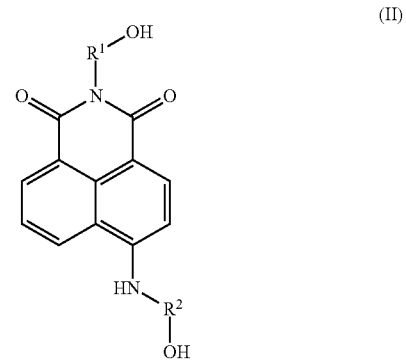

(II)

wherein
each of $R^1$ and $R^2$ is, independently of the other, a saturated, linear hydrocarbon chain having from 2 to 10 carbon atoms;
with an ester of Formula (III) or mixture thereof

(III)

wherein
R is selected from saturated or unsaturated, linear or branched, hydrocarbon chain having from 1 to 8 carbon atoms and from 0 to 2 double bonds, and phenyl optionally substituted with from 1 to 3 saturated or unsaturated, linear or branched, hydrocarbon chains having from 1 to 6 carbon atoms and from 0 to 2 double bonds; and
$R^3$ a saturated or unsaturated, linear or branched, hydrocarbon chain having from 8 to 24 carbon atoms, and from 0 to 4 double bonds,
to provide a compound of Formula (I) or mixture thereof.

In certain embodiments, $R^1$ and $R^2$ independently have from 2 to 10 carbon atoms.

In certain embodiments, the hydrocarbon chains of the fatty acid moieties $Z^1$ and $Z^2$ independently have from 12 to 22 carbon atoms.

In certain embodiments, the fatty acid moieties $Z^1$ and $Z^2$ are independently selected from the fatty acid moieties of the group of fatty acids consisting of behenic acid, citronellic acid, decanoic acid, docosanoic acid, 11,14-eicosadienoic acid, eicosanoic acid, cis-11-eicosanoic acid, erucic acid, heptadecanoic acid, isononanoic acid, lauric acid, linoleic acid, linolenic acid, margaric acid, myristic acid, myristoleic acid, neodecanoic acid, nonadecanoic acid, neoheptanoic acid, neononanoic acid, nonanoic acid, octanoic acid, isooctanoic acid, neo octanoic acid, oleic acid, palmitic acid, palmitoleic acid, pentadecanoic acid, isostearic acid, stearic acid, tridecanoic acid, undecanoic acid and combinations thereof. In certain embodiments, the fatty acid moieties $Z^1$ and $Z^2$ are independently selected from the fatty acid moieties of the group of fatty acids consisting of linoleic acid, linolenic acid, oleic acid, palmitic acid, stearic acid and combinations thereof.

In certain embodiments, the naphthalimide diol of Formula (II) is:

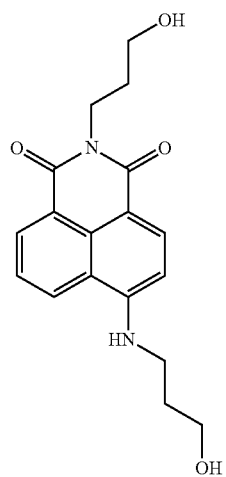 [SMILES: O=C1c2cccc3c(NCCCO)ccc(c23)C(=O)N1CCCO]

In certain embodiments, R is methyl, ethyl, propyl or combination thereof.

In certain embodiments, the reacting of the naphthalimide diol of Formula (II) with the fatty acid ester of Formula (III) is carried out in the presence of a catalyst. In some embodiments, the catalyst is sodium hydroxide, calcium oxide, zinc acetate, zinc oxalate, or combination thereof. In other embodiments, the catalyst is an organo-tin catalyst. In some embodiments, the organo-tin catalyst is stannous oxalate.

Also provided is another process for preparing a naphthalimide diester of Formula (I) or mixture thereof,

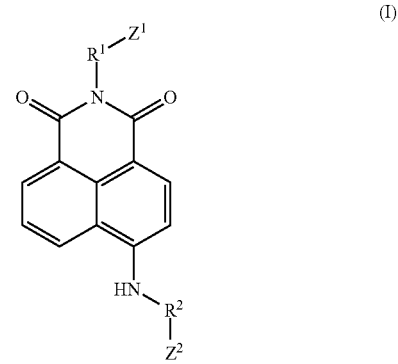

wherein
each of $R^1$ and $R^2$ is, independently of the other, a saturated, linear hydrocarbon chain having from 2 to 10 carbon atoms;
each of $Z^1$ and $Z^2$ is, independently of the other, a fatty acid moiety having a saturated or unsaturated, linear or branched, hydrocarbon chain having from 8 to 24 carbon atoms, and from 0 to 4 double bonds.

The process comprises:
(a) reacting a fatty acid having the formula (IV) or mixture thereof

with a molar excess of naphthalimide diol of Formula (II) with respect to the fatty acid,

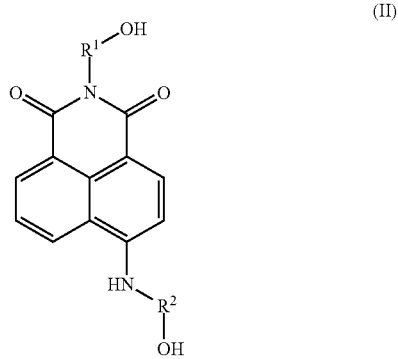

wherein
each of $R^1$ and $R^2$ is, independently of the other, a saturated, linear hydrocarbon chain having from 2 to 10 carbon atoms;
until substantially all of the fatty acid of formula (IV) has been reacted to form a naphthalimide diester of Formula (I); and (b) reacting unreacted naphthalimide diol with an ester of Formula (III) or mixture thereof

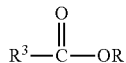
(III)

wherein
R is selected from saturated or unsaturated, linear or branched, hydrocarbon chain having from 1 to 8 carbon atoms and from 0 to 2 double bonds, and phenyl optionally substituted with from 1 to 3 saturated or unsaturated, linear or branched, hydrocarbon chains having from 1 to 6 carbon atoms and from 0 to 2 double bonds; and $R^3$ a saturated or unsaturated, linear or branched, hydrocarbon chain having from 8 to 24 carbon atoms, and from 0 to 4 double bonds, to form additional compound of Formula (I) or mixture thereof.

In certain embodiments, $R^1$ and $R^2$ independently have from 2 to 10 carbon atoms.

In certain embodiments, the hydrocarbon chains of the fatty acid moieties $Z^1$ and $Z^2$ independently have from 12 to 22 carbon atoms In certain embodiments, the fatty acid moieties $Z^1$ and $Z^2$ are independently selected from the fatty acid moieties of the group of fatty acids consisting of behenic acid, citronellic acid, decanoic acid, docosanoic acid, 11,14-eicosadienoic acid, eicosanoic acid, cis-11-eicosanoic acid, erucic acid, heptadecanoic acid, isononanoic acid, lauric acid, linoleic acid, linolenic acid, margaric acid, myristic acid, myristoleic acid, neodecanoic acid, nonadecanoic acid, neoheptanoic acid, neononanoic acid, nonanoic acid, octanoic acid, isooctanoic acid, neo octanoic acid, oleic acid, palmitic acid, palmitoleic acid, pentadecanoic acid, isostearic acid, stearic acid, tridecanoic acid, undecanoic acid and combinations thereof. In certain embodiments, the fatty acid moieties $Z^1$ and $Z^2$ are independently selected from the fatty acid moieties of the group of fatty acids consisting of linoleic acid, linolenic acid, oleic acid, palmitic acid, stearic acid and combinations thereof.

In certain embodiments, the naphthalimide diol of Formula (II) is:

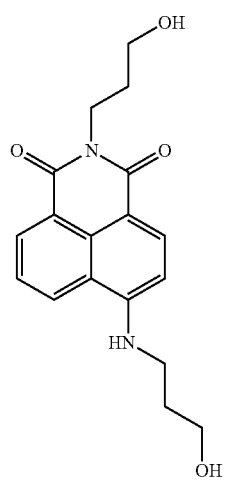 [SMILES: O=C1c2cccc3c(NCCCO)ccc(c23)C(=O)N1CCCO]

In certain embodiments, R is methyl, ethyl, propyl or combination thereof.

In certain embodiments, reacting the naphthalimide diol of Formula (II) with the fatty acid of Formula (IV) in (a) and reacting naphthalimide diol with an ester of Formula (III) in (b) are carried out in the presence of a catalyst. In some embodiments, the catalyst is sodium hydroxide, calcium oxide, zinc acetate, zinc oxalate, or combination thereof. In other embodiments, the catalyst is an organo-tin catalyst. In some embodiments, the organo-tin catalyst is stannous oxalate.

Further provided are compositions comprising a naphthalimide diester of Formula (I) or mixture thereof,

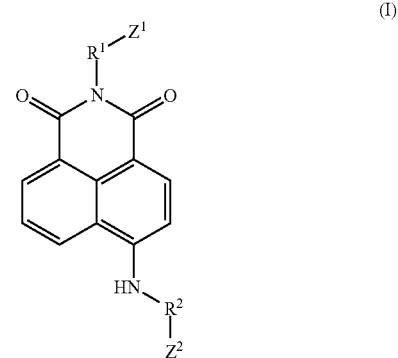
(I)

wherein
each of $R^1$ and $R^2$ is, independently of the other, a saturated, linear hydrocarbon chain having from 2 to 10 carbon atoms; and each of $Z^1$ and $Z^2$ is, independently of the other, a fatty acid moiety having a saturated or unsaturated, linear or branched, hydrocarbon chain having from 8 to 24 carbon atoms, and from 0 to 4 double bonds;

and the composition has an acid value according to ASTM D664-11ae1 of about 2 mg/g KOH or less, about 1 mg/g KOH or less, about 0.5 mg/g KOH or less, or about 0.1 mg/g KOH or less.

In certain embodiments, $R^1$ and $R^2$ independently have from 2 to 10 carbon atoms.

In certain embodiments, the hydrocarbon chains of the fatty acid moieties $Z^1$ and $Z^2$ independently have from 12 to 22 carbon atoms.

In certain embodiments, the fatty acid moieties $Z^1$ and $Z^2$ are independently selected from the fatty acid moieties of the group of fatty acids consisting of behenic acid, citronellic acid, decanoic acid, docosanoic acid, 11,14-eicosadienoic acid, eicosanoic acid, cis-11-eicosanoic acid, erucic acid, heptadecanoic acid, isononanoic acid, lauric acid, linoleic acid, linolenic acid, margaric acid, myristic acid, myristoleic acid, neodecanoic acid, nonadecanoic acid, neoheptanoic acid, neononanoic acid, nonanoic acid, octanoic acid, isooctanoic acid, neo octanoic acid, oleic acid, palmitic acid, palmitoleic acid, pentadecanoic acid, isostearic acid, stearic acid, tridecanoic acid, undecanoic acid and combinations thereof. In certain embodiments, the fatty acid moieties $Z^1$ and $Z^2$ are independently selected from the fatty acid moieties of the group of fatty acids consisting of linoleic acid, linolenic acid, oleic acid, palmitic acid, stearic acid and combinations thereof.

In certain embodiments, the composition comprises no more than about 2 mol % alcohol.

In certain embodiments, the composition further comprises a carrier.

As envisioned in the present invention with respect to the disclosed compositions of matter and methods, in one aspect the embodiments of the invention comprise the components and/or steps disclosed herein. In another aspect, the embodiments of the invention consist essentially of the components and/or steps disclosed herein. In yet another aspect, the embodiments of the invention consist of the components and/or steps disclosed herein.

Definitions

Unless defined otherwise, all technical and scientific terms used herein have the same meaning as commonly understood by one of ordinary skill in the art to which the invention pertains. Although any methods and materials similar or equivalent to those described herein can be used in the practice for testing of the present invention, the preferred materials and methods are described herein. In describing and claiming the present invention, the following terminology will be used.

It is also to be understood that the terminology used herein is for the purpose of describing particular embodiments only, and is not intended to be limiting.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of +/−10%, more preferably +/−5%, even more preferably +/−1%, and still more preferably +/−0.1% from the specified value, as such variations are appropriate.

As used herein "fluid" means liquid and gas. Fluid systems are closed systems which contain a fluid; examples are refrigerant systems, hydraulic systems, transmission systems, heating systems, ventilating systems, and systems which utilize petrochemical oils, and which utilize hydrocarbon lubricant.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Any open valence appearing on a carbon, oxygen or nitrogen atom in the structures herein indicates the presence of a hydrogen atom.

DETAILED DESCRIPTION OF THE INVENTION

Naphthalimide diesters of Formula (I) are prepared by processes that result in a product composition having very low, if any, free fatty acid. The processes of the invention eliminate the need for post-processing of reaction product with epoxy scavenging agents to reduce residual fatty acid. The naphthalimide diesters of Formula (I) are characterized by low crystallinity, and resist crystallization during storage.

One Step Process

In one embodiment, naphthalimide diesters of Formula (I) are prepared by a one-step process comprising reacting the naphthalimide diol of Formula (II), or a mixture thereof, with an ester of Formula (III) or a mixture thereof. The reaction utilizes no fatty acid reactant in the esterification of the diol (II), since the esterification donor is a fatty acid ester, not a fatty acid, i.e., the esterification reaction is a transesterification. In contrast, naphthalimide diester dye compositions prepared according to the fatty acid-based esterification method of U.S. Pat. No. 6,248,890 contain substantial amounts of unreacted fatty acid and up to 10% alcohols from unreacted starting materials and additives. It is believed that the acid number of the esterification product of U.S. Pat. No. 6,248,890, as illustrated by the working examples thereof, is at least 50 mg/g KOH. A typical epoxy treatment may be capable of reducing the acid value to as low as 10 mg/g KOH. With continued reaction and addition of epoxy, the acid value may be reduced to between 6 mg/g KOH and 10 mg/g KOH. In contrast, naphthalimide diester dye compositions prepared according to the process of the present invention is characterized by a very low acid content, with an acid value as determined by ASTM D664-11ae1 of about 2 mg/g KOH or less, about 1.5 mg/g KOH or less, about 1 mg/g KOH or less, about 0.5 mg/g KOH or less, about 0.3 mg/g KOH or less, and even as low as about 0.1 mg/g or less.

The low acid level is attained without the need for treatment with fatty acid-scavenging scavenging epoxy additives. The naphthalimide diester dye preparations according to the present invention also preferably contain no more than about 2 mol % alcohol from unreacted starting material, more preferably no more than about 1 mol %, more preferably no more than about 0.5 mol %, and most preferably no more than about 0.1 mol %. The process of the present invention thus provides for substantially improved naphthalimide diester preparations for use in tracer compositions.

$R^1$ and $R^2$ in the Formula (II) diol,

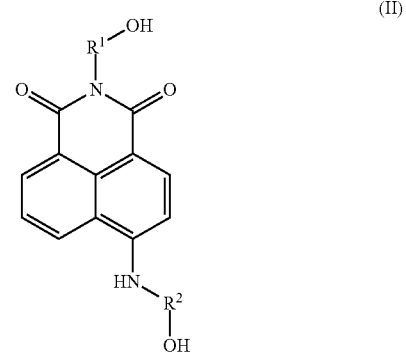

are independently of each other selected from saturated, linear hydrocarbon chains having from 2 to 10 carbon atoms, preferably from 2 to 8 carbon atoms, most preferably from 1 to 3 carbon atoms. Three carbon atoms are preferred.

One suitable naphthalimide diol of Formula (II) is Solvent Yellow 131, a 4-(3'-hydroxypropylaminoe)-n-(3"-hydroxypropyl)naphthalimide, commercially available under the trade name Mohawk yellow dye from Day-Glo Color Corporation. The structure of Solvent Yellow 131 is shown below:

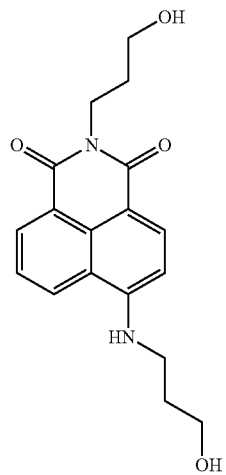 [SMILES: O=C1c2cccc3c(NCCCO)ccc(c23)C(=O)N1CCCO]

R in the Formula (III) fatty acid ester,

is a saturated or unsaturated, linear or branched, hydrocarbon chain having from 1 to 8 carbon atoms and from 0 to 2 double bonds. Preferably the carbon chain length is from 1 to 6, more preferably from 1 to 4, more preferably from 1 to 3. In such embodiments, the number of double bonds is preferably zero. Most preferably, R is methyl.

R in the Formula (III) fatty acid ester may also be phenyl optionally substituted with from 1 to 3 saturated or unsaturated, linear or branched, hydrocarbon chains having from 1 to 6 carbon atoms each and from 0 to 2 double bonds. Preferably, the substituent carbon chains attached to phenyl contain from 1 to 4, preferably 1 to 3, more preferably 1 to 2, carbon atoms, and zero double bonds. In one embodiment, R is phenyl substituted at the 4-position with $(C_1-C_3)$alkyl, more preferably ethyl or methyl, most preferably methyl.

$R^3$ in the Formula (III) fatty acid ester is a saturated or unsaturated, linear or branched, hydrocarbon chain having from 8 to 24 carbon atoms, and from 0 to 4 double bonds. $R^3$ preferably has from 12 to 22 carbon atoms, most preferably from 16 to 20 carbon atoms, and from 1 to 4 double bonds, most preferably 2 to 3 double bonds.

It should be appreciated that a mixture of Formula (III) esters, and/or mixture of Formula (II) diols may be reacted in the process. It should be further appreciated that the naphthalimide diester product of Formula (I) prepared from such mixed reactants will thus comprise a mixture of molecules of Formula (I). For the most part, the ester reactant (III) will comprise a mixture of esters encompassing a range of fatty acid ester moieties, and the naphthalimide diester product of Formula (I) will comprise a mixture of diesters reflecting the range of fatty acid moieties present in ester reactant (III). By "fatty acid moiety" is meant the radical $R^3C(O)$—O—. Fatty acid ester mixtures useful as reactant (III) are commercially available.

Suitable linear esters useful as fatty acid esters (III) include, for example, esters of the following fatty acids: behenic acid, citronellic acid, decanoic acid, docosanoic acid, 11,14-eicosadienoic acid, eicosanoic acid, cis-11-eicosanoic acid, erucic acid, heptadecanoic acid, lauric acid, linoleic acid, linolenic acid, margaric acid, myristic acid, myristoleic acid, neodecanoic acid, nonanoic acid, octanoic acid, oleic acid, palmitic acid, palmitoleic acid, pentadecanoic acid, stearic acid, tridecanoic acid and undecanoic acid.

Suitable branched esters as fatty acid ester (III) include, for example, the following branched fatty acids: isononanoic acid, neoheptanoic acid, neononanoic acid, nonadecanoic acid, isooctanoic acid, neooctanoic acid and isostearic acid.

Fatty ester (III) is transesterified onto the primary hydroxyl groups of the naphthalimide diol (II), preferably in the presence of a catalyst and optionally an antioxidant. The transesterification results in naphthalimide diesters of Formula (I) wherein $Z^1$ and $Z^2$ are fatty acid moieties of the indicated fatty acids.

The fatty acid esters (III) are preferably methyl, ethyl or propyl fatty acid esters of the aforesaid fatty acids, most preferably methyl esters.

Suitable catalysts include sodium hydroxide, calcium oxide, zinc acetate, zinc oxalate, other conventional esterification and transesterification catalysts, and preferably an organo-tin compound. A suitable tin catalyst is stannous oxalate commercially available under the trade name Fascat 2001 from Atochem Company. A suitable antioxidant is commercially available under the trade name Irganox 1076 antioxidant from Ciba-Chemical Company.

The fatty acid ester-diol reaction mixture is preferably heated above 170° C., more preferably above 180° C., and most preferably above 190° C. Where the diol is Solvent Yellow 131, the fatty acid ester and diol are preferably heated to at least about 190° C. to dissolve the diol. The mixture is preferably held at such elevated temperature for at least two hours, to obtain at least 90% reaction. Preferably the reaction temperature is held from about 6 to about 36 hours. Satisfactory results are achieved by heating to 195° C. and maintaining that temperature for about six hours, and provides a reaction product which comprises about 98 mol % naphthalimide diester, the balance comprising naphthalimide ester/alcohol. Maintaining the reaction temperature at 195° C. for an additional 16 hours typically yields a reaction product mixture that contains about 0.1-2 mol % residual diol.

Two Step Process

According to another embodiment, diesters of Formula (I) are prepared by a two-step process. In a first step, the naphthalimide diol of Formula (II), or a mixture thereof, is reacted with a fatty acid of Formula (IV),

or a mixture of such fatty acids, in the presence of a stoichiometric excess of diol to fatty acid, under conditions which result in reaction of substantially all the fatty acid. In a second step, unreacted diol attributable to the stoichiometric diol excess in the first step is then reacted with fatty acid ester (III) to generate additional Formula (I) diester. In preferred embodiments, at least about 98 mol %, at least about 99 mol %, at least about 99.5 mol % or at least about 99.9 mol % of the fatty acid (IV) in the reaction mixture is reacted in the first step.

One skilled in the art may select the appropriate mole ratio of fatty acid to diol to fully react the fatty acid and achieve a low product acid value. According to certain embodiments, the molar ratio of fatty acid to diol at the beginning of the first step of the two-step process ranges from about 0.05 fatty acid to about 0.95 fatty acid, per 1.0 mole of diol. In certain embodiments, the ratio is from about 0.3 to about 0.9, from about 0.4 to about 0.9, from about 0.5 to about 0.9, from about 0.6 to about 0.9, from about 0.7 to about 0.9, or from about 0.8 to about 0.9, mole of fatty acid per 1.0 mole of diol. Particularly preferred are 0.80, 0.81, 0.82, 0.83 0.84 and 0.85 moles fatty acid per 1.0 mole of diol.

The fatty acid-diol mixture is preferably heated above 170° C., more preferably above 180° C., and most preferably above 190° C., in the first step. Where the diol is Solvent Yellow 131, the fatty acid and diol is preferably heated to at least about 190° C. to dissolve the diol. The mixture is held at such elevated temperature for at least 12 hours, preferably at least 24 hours, and more preferably at least 36 hours. Good results have been obtained by heating to 195° C. and maintaining that temperature for at least 36 hours. This results in a first step reaction product acid value of less than 2 mg/g of KOH. Maintaining a 195° C. for an additional time lowers the acid value further, to less than 1 mg/g KOH, more preferably less than 0.5 mg/g KOH.

Once a low acid value is achieved, fatty acid ester is then added to the reaction mixture to react with the unreacted excess diol and produce additional naphthalimide diester (I) in the second step of the process. The reaction mixture comprising the added fatty acid ester (III) is preferably held at above 170° C., more preferably above 180° C., and most preferably above 190° C. for at least two hours, preferably at least 12 hours, and more preferably at least 18 hours, to react the excess diol from the previous step and reduce the diol level below about 2 mol %, preferably below about 1 mol %, and more preferably below about 0.5 mol %. Good results have been obtained by heating the reaction mixture to 195° C. and maintaining that temperature for about 18 hours. These conditions typically provides about 0.1-2 mol % residual diol and an acid value below 1 mg/g KOH.

Upon completion of either the one-step process or the alternative two-step process, the fluorescent naphthalimide diester dye is cooled below 120° C., more preferably below 100° C., and most preferably below 80° C. and preferably filtered to provide a low acid value preparation comprising Formula (I) diester.

According to one preferred embodiment, a fluorescent naphthalimide diester dye mixture is produced comprising different diester molecules of Formula (I). The reactant ester of Formula (III) for the one-step and two-step processes, and the reactant fatty acid (IV) for the two-step process, are selected to provide yield the desired mixture of fatty acid moieties $Z^1$ and $Z^2$ in the fluorophore of Formula (I). In one embodiment, the reactants are selected such that $Z^1$ and/or $Z^2$ comprise the fatty acid moieties of oleic acid, linolenic acid or linoleic acid.

In one embodiment, the fluorescent naphthalimide diester dye produced is a mixture of fluorescent naphthalimide diester fluorophores which comprises at least about 50 wt. %, more preferably at least about 60 wt. %, even more preferably at least about 70 wt. %, most preferably at least about 80 wt. % fluorescent naphthalimide diester fluorophores in which $Z^1$ or $Z^2$, or both, are selected from the group consisting of the fatty acid moieties of linoleic acid, linolenic acid, oleic acid, and mixtures thereof.

In another embodiment, the fluorescent naphthalimide diester dye is preferably a mixture of fluorescent naphthalimide diester fluorophores wherein $Z^1$ or $Z^2$, or both, are selected from the group consisting of the fatty acid moiety of linoleic acid, the fatty acid moiety of oleic acid, the fatty acid moiety of linolenic acid, or mixtures thereof. Preferably the fluorescent naphthalimide diester dye comprises: from about 0.1 to about 99.9 wt. %, more preferably from about 20 to about 90 wt. % of the fatty acid moiety of oleic acid; from about 0.1 to about 99.9 wt. %, more preferably from about 20 to about 90 wt. % of the fatty acid moiety of linoleic acid; from about 0.1 to about 99.9 wt. %, more preferably from about 20 to about 90 wt. %, of the fatty acid moiety of linolenic acid.

In another embodiment, the fluorescent naphthalimide diester dye is preferably a mixture of fluorescent naphthalimide diester fluorophores wherein $Z^1$ or $Z^2$, or both, comprise: from about 0.1 to about 20 wt. %, more preferably from about 1 to about 6 wt. %, most preferably about 3 wt. % of the fatty acid moiety of myristic acid; from about 0.1 to about 20 wt. %, more preferably from about 1 to about 10 wt. %, most preferably about 1 wt. % of the fatty acid moiety of margaric acid; from about 0.1 to about 20 wt. %, more preferably from about 1 to about 10 wt. %, most preferably about 2 wt. % of the fatty acid moiety of stearic acid; from about 1 to about 20 wt. %, more preferably from about 1 to about 10 wt. %, most preferably about 2 wt. % of the fatty acid moiety of myristoleic acid; from about 0.1 to about 90 wt. %, more preferably from about 0.5 to about 70 wt. %, most preferably about 1 wt. % of the fatty acid moiety of linolenic acid; from about 1 to about 90 wt. %, more preferably from about 20 to about 70 wt. %, most preferably about 69 wt. % of the fatty acid moiety of oleic acid; from about 16 to about 90 wt. %, more preferably from about 5 to about 85 wt. %, most preferably about 10 wt. % of the fatty acid moiety of linoleic acid; from about 0.1 to about 20 wt. %, more preferably from about 1 to about 10 wt. %, most preferably about 6 wt. % of the fatty acid moiety of palmitoleic acid; and about from about 0.1 to about 20 wt. %, more preferably from about 1 to about 10 wt. %, most preferably about 6 wt. % of the fatty acid moiety of palmitic acid.

In another embodiment, the fluorescent naphthalimide diester dye is preferably a mixture of fluorescent naphthalimide diester fluorophores wherein $Z^1$ or $Z^2$ or both, comprise: from about 0.1 to about 20 wt. %, more preferably from about 1 to about 8 wt. %, most preferably about 4 wt. % of the fatty acid moiety of steric acid; from about 10 to about 90 wt. %, more preferably from about 20 to about 70 wt. %, most preferably about 24 wt. % of the fatty acid moiety of oleic acid; about from about 20 to about 90 wt. %, more preferably from about 40 to about 70 wt. %, most preferably about 53 wt. % of the fatty acid moiety of linoleic acid; from about 1 to about 90 wt. %, more preferably from about 3 to about 70 wt. %, most preferably about 6 wt. % of the fatty acid moiety of linolenic acid; from about 1 to about 20 wt. %, more preferably from about 7 to about 14 wt. %, most preferably about 11 wt. % of the fatty acid moiety of palmitic acid.

In each of the aforesaid embodiments, the reactant ester of Formula (III) for the one-step and two-step processes, and the reactant fatty acid of Formula (IV) for the two-step process, are selected to yield the fatty acid moieties $Z^1$ and $Z^2$ that result in the above-indicated product distributions for the naphthalimide diester dye fluorophore of Formula (I).

For preparation of fluorescent naphthalimide diester fluorophore according to Formula (I) by the two-step process, an example of a suitable mixture of fatty acids for the first step of the process typically contains about 3 wt. % myristic acid, about 1 wt. % margaric acid, about 2 wt. % stearic acid, about 2 wt. % myristoleic acid, about 1 wt. % linolenic acid, about 69 wt. % oleic acid, about 10 wt. % linoleic acid, about 6 wt. % palmitoleic acid, and about 6 wt. % palmitic acid.

Another example of a suitable mixture fatty acids typically contains of about 4 wt. % stearic acid, about 24 wt. % oleic acid, about 53 wt. % linoleic acid, about 6 wt. % linolenic acid, and about 11 wt. % palmitic acid.

Another example of a suitable mixture of fatty acids typically contains of about 4.5 wt. % stearic acid, about 25.5 wt. % oleic acid, about 56 wt. % linoleic acid, about 7 wt. % linolenic acid, and about 7 wt. % palmitic acid.

Mixtures of fatty acid esters for use in either the one-step or two-step process containing proportions of esters similar to the proportions of fatty acids contained in the aforementioned fatty acid mixtures are also commercially available, and may be utilized as ester mixtures in both the one-step process, and in the second step of the two-step process. One such fatty acid ester mixture is the methyl ester blend, Soy Methyl Esters #970, available from Columbus Vegetable Oils containing a blend of oleic, linoleic, palmitic, stearic and linolenic methyl esters. Based on the fatty acid content of soy bean oil, a mixture of fatty acid esters derived from soy bean oil may contain about 19-29 wt. % oleic methyl ester, about 45-55 wt. % linoleic methyl ester, about 5-15 wt. % palmitic methyl ester, about 2-6 wt. % stearic methyl ester and about 5-9 wt. % linolenic methyl ester.

Compositions of Fluorescent Naphthalimide Diesters

The invention is also directed to compositions comprising a naphthalimide diester of Formula (I) or mixture thereof. The compositions are characterized by an acid value according to ASTM D664-11ae1 of about 2 mg/g KOH or less. The compositions preferably also have an alcohol content of no more than about 2 mol %. The compositions, which result from the synthetic processes described herein, may be augmented with additional ingredients that do not increase the acid value.

In one embodiment, naphthalimide diesters according to Formula (I) may be combined with carriers to form "tracers" or "tracer compositions", for use in fluid system leak detection. The carrier may be an organic liquid, which is preferably compatible with, or the same as, an organic liquid used in the fluid system that is to be tested for leaks. The carrier may also be an inorganic liquid, such as a silicone oil, that is preferably compatible with, or the same as, an inorganic liquid used in the fluid system that is to be tested for leaks. For example, the carrier may be: transmission fluid, hydraulic fluid, engine oil, or lubricant from refrigerant system or heating system. Such liquid carriers are for example polyalkylene glycols, polyolesters, polyvinyl ethers, alkylbenzenes, mineral oil, polyalphaolefins, synthetic hydrocarbons refrigerant lubricants and refrigerants, liquid hydrocarbons, particularly hydrocarbon lubricants, motor oil, gear oil, transmission fluid, hydraulic fluid, synthetic oils, petroleum solvents.

A tracer composition of the invention is characterized by an acid value of 2 mg/k KOH or less, preferably 1.5 mg/g KOH or less, more preferably 1 mg/g KOH or less, more preferably 0.5 mg/g KOH or less, more preferably 0.4 mg/g KOH or less, more preferably 0.3 mg/g KOH or less, more preferably 0.2 mg/g KOH or less, most preferably 0.1 mg/g KOH or less. The acid values are determined according to ASTM D664-11ae1. The tracer composition is also preferably free of reaction products that result from the reaction of excess fatty acid and epoxy compounds. The tracer composition also preferably comprises no more than about 2 mol % alcohol preferably no more than about 1 mol %, more preferably no more than about 0.5 mol %, most preferably no more than about 0.1 mol %.

Fluid System Application

In another aspect, the invention relates to a fluid system containing a naphthalimide diesters according to Formula (I). A tracer composition may be introduced into fluid systems for leak detection according to conventional techniques, such as described in U.S. Pat. Nos. 6,248,890, 6,056,162, and 6,165,384 the entire disclosures of which are incorporated herein by reference. The concentration of the fluorescent naphthalimide diester dye in the fluid system is preferably less than 1 wt. %, more preferably less than 0.01 wt. %, most preferably about 0.005 wt. %. While greater than 1 wt. % fluorescent naphthalimide diester dye is useful, it is typically not necessary and contributes to the cost.

The fluorescent naphthalimide diester dye can be applied directly to a bulk volume of a liquid that is utilized in the fluid system, such as a lubricant, at a concentration of preferably less than 1 wt. %, more preferably less than 0.01 wt. %, most preferably about 0.005 wt. %, so that the bulk of such lubricant becomes the carrier and the entire bulk volume carrier and fluorescent naphthalimide diester dye become the tracer. As a result, the fluorescent naphthalimide diester dye is administered along with the lubricant carrier when it is initially added to the system, or when the lubricant carrier is replenished or replaced.

The fluorescent naphthalimide diester dye may also be added to a smaller volume of carrier, to form a concentrate which is the added into the operating fluid of system already charged with fluid. Such concentrates may contain the fluorescent naphthalimide diester dye at a concentration of from about 0.05 to 100 wt. %, for example. For applications requiring a high strength concentrate, the composition may comprise from about 30 wt. % to about 100% wt. % fluorescent naphthalimide diester dye. For typical applications, the composition may comprise, for example, from about 5 wt. % to about 30 wt. % fluorescent naphthalimide diester dye. For dye-sensitive applications, the composition may comprise, for example, from about 0.05 wt. % to about 30 wt. % fluorescent naphthalimide diester dye. The fluorescent naphthalimide diester tracer is then administered to a fluid system, allowed to distribute through the fluid system and mix with the liquids such as lubricant, in the fluid system.

Whichever method of administration is employed, the fluid system is then inspected for leaks by scanning the exterior of the system with ultraviolet or visible light and inspecting the system for fluorescence which indicate a leak in the system.

The practice of the invention is illustrated by the following non-limiting examples. The skilled person skilled in the art will appreciate that it may be necessary to vary the procedures for any given embodiment of the invention.

Example 1

A fluorescent yellow fluorophore was synthesized by reacting 72 grams of fatty ester blend, Soy Methyl Esters #970, from Columbus Vegetable Oils, which represents a methyl ester blend composed of oleic methyl ester, linoleic methyl ester, palmitic methyl ester, stearic methyl ester, and linolenic methyl ester, with 40 grams of Mohawk yellow dye, and 0.7 grams of Fascat 2001 organo-tin catalyst. The mixture was heated to 195° C. and held at that temperature for five hours. Upon completion of the reaction, the naphthalimide diester was cooled, filtered and tested in polyalkylene glycol for solubility and fluorescence. The resulting fluorescent naphthalimide diester dye was liquid at room temperature and exhibited good solubility and fluorescence in polyalkylene glycol. The fluorescent naphthalimide diester dye had an acid number of 0.48 mg/g KOH by ASTM D664-11ae1 and a residual diol concentration of 0.3 mol %.

Example 2

A fluorescent yellow fluorophore was synthesized by reacting 400 grams of fatty ester blend, Soy Methyl Esters #970, from Columbus Vegetable Oils with 204 grams of Mohawk yellow dye, and 18 grams of calcium oxide, prepared from calcium carbonate at 850° C. The mixture was heated to 180° C. and held at that temperature for 21 hours. Upon completion of the reaction, the naphthalimide diester was cooled, filtered and tested in polyalkylene glycol for solubility and fluorescence. The resulting fluorescent naphthalimide diester dye was liquid at room temperature and exhibited good solubility and fluorescence in polyalkylene glycol. The fluorescent naphthalimide diester dye had an acid number of <1 mg/g KOH by ASTM D664-11ae1 and a residual diol concentration of 0.9 mol %

Example 3

A fluorescent yellow fluorophore was synthesized by reacting 400 grams of fatty ester blend, Soy Methyl Esters #970, from Columbus Vegetable Oils with 204 grams of Mohawk yellow dye, and 30 grams of zinc acetate. The mixture was heated to 180° C. and held at that temperature for 17 hours. Upon completion of the reaction, the naphthalimide diester was cooled, filtered and tested in polyalkylene glycol for solubility and fluorescence. The resulting fluorescent naphthalimide diester dye was liquid at room temperature and exhibited good solubility and fluorescence in polyalkylene glycol. The fluorescent naphthalimide diester dye had an acid number of <1 mg/g KOH by ASTM D664-11ae1 and a residual diol concentration of 0.4 mol %.

Example 4

A fluorescent yellow fluorophore was synthesized by reacting 40 grams of a commercially available fatty acid blend with 204 grams of Mohawk yellow dye, and 0.2 grams of Fascat 2001 organo-tin catalyst. The mixture was heated to 190° C. and held at that temperature for 18 hours. Subsequently, 360 grams of fatty ester blend, Soy Methyl Esters #970, from Columbus Vegetable Oils was added and held at 190° C. for an additional 21 hours. Upon completion of the reaction, the naphthalimide diester was cooled, filtered and tested in polyalkylene glycol for solubility and fluorescence. The resulting fluorescent naphthalimide diester dye was liquid at room temperature and exhibited good solubility and fluorescence in polyalkylene glycol. The fluorescent naphthalimide diester dye had an acid number of 0.1 mg/g KOH by ASTM D664-11ae1 and a residual diol concentration of 0.1 mol %.

Example 5

A fluorescent yellow fluorophore was synthesized by reacting 360 grams of a commercially available fatty acid blend with 204 grams of Mohawk yellow dye, and 0.2 grams of Fascat 2001 organo-tin catalyst. The mixture was heated to 190° C. and held at that temperature for 18 hours. Subsequently, 40 grams of fatty ester blend, Soy Methyl Esters #970, from Columbus Vegetable Oils was added and held at 190° C. for an additional 18 hours. Upon completion of the reaction, the naphthalimide diester was cooled, filtered and tested in polyalkylene glycol for solubility and fluorescence. The resulting fluorescent naphthalimide diester dye was liquid at room temperature and exhibited good solubility and fluorescence in polyalkylene glycol. The fluorescent naphthalimide diester dye had an acid number of 0.8 mg/g KOH by ASTM D664-11ae1 and a residual diol concentration of 0.2 mol %.

Example 6

A fluorescent yellow fluorophore was synthesized by reacting 320 grams of a commercially available fatty acid blend with 204 grams of Mohawk yellow dye, and 0.3 grams of Fascat 2001 organo-tin catalyst. The mixture was heated to 190° C. and held at that temperature for 18 hours. Subsequently, 80 grams of fatty ester blend, Soy Methyl Esters #970, from Columbus Vegetable Oils was added and held at 190° C. for an additional 18 hours. Upon completion of the reaction, the naphthalimide diester was cooled, filtered and tested in polyalkylene glycol for solubility and fluorescence. The resulting fluorescent naphthalimide diester dye was liquid at room temperature and exhibited good solubility and fluorescence in polyalkylene glycol. The fluorescent naphthalimide diester dye had an acid number of 0.2 mg/g KOH by ASTM D664-11ae1 and a residual diol concentration of 0.2 mol %.

Example 7

A fluorescent yellow fluorophore was synthesized by reacting 320 grams of a commercially available fatty acid blend with 204 grams of Mohawk yellow dye, and 1.5 grams of zinc oxalate. The mixture was heated to 190° C. and held at that temperature for 18 hours. Subsequently, 80 grams of fatty ester blend, Soy Methyl Esters #970, from Columbus Vegetable Oils was added and held at 190° C. for an additional 36 hours. Upon completion of the reaction, the naphthalimide diester was cooled, filtered and tested in polyalkylene glycol for solubility and fluorescence. The resulting fluorescent naphthalimide diester dye was liquid at room temperature and exhibited good solubility and fluorescence in polyalkylene glycol. The fluorescent naphthalimide diester dye had an acid number of 1.3 mg/g KOH by ASTM D664-11ae1 and a residual diol concentration of 1.5 mol %.

All references discussed herein are incorporated by reference. One skilled in the art will readily appreciate that the present invention is well adapted to carry out the objects and obtain the ends and advantages mentioned, as well as those inherent therein. The present invention may be embodied in other specific forms without departing from the spirit or essential attributes thereof and, accordingly, reference should be made to the appended claims, rather than to the foregoing specification, as indicating the scope of the invention.

The invention claimed is:

1. A process for preparing a naphthalimide diester of Formula (I) or mixture thereof,

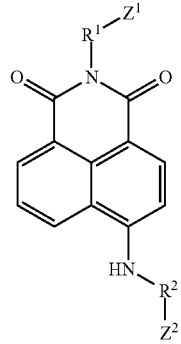
(I)

wherein
each of $R^1$ and $R^2$ is, independently of the other, a saturated, linear hydrocarbon chain having from 2 to 10 carbon atoms;
each of $Z^1$ and $Z^2$ is, independently of the other, a fatty acid moiety having a saturated or unsaturated, linear or branched, hydrocarbon chain having from 8 to 24 carbon atoms, and from 0 to 4 double bonds;
the process comprising:
reacting a naphthalimide diol of Formula (II) or mixture thereof

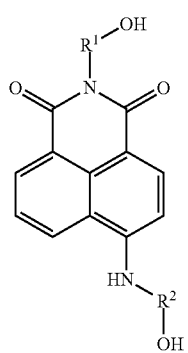
(II)

wherein
each of $R^1$ and $R^2$ is, independently of the other, a saturated, linear hydrocarbon chain having from 2 to 10 carbon atoms;
with an ester of Formula (III) or mixture thereof

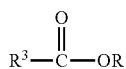
(III)

wherein
R is selected from saturated or unsaturated, linear or branched, hydrocarbon chain having from 1 to 8 carbon atoms and from 0 to 2 double bonds, and phenyl optionally substituted with from 1 to 3 saturated or unsaturated, linear or branched, hydrocarbon chains having from 1 to 6 carbon atoms and from 0 to 2 double bonds; and $R^3$ is a saturated or unsaturated, linear or branched, hydrocarbon chain having from 8 to 24 carbon atoms, and from 0 to 4 double bonds,
to provide a compound of Formula (I) or mixture thereof.

2. The process according to claim 1 wherein the hydrocarbon chains of the fatty acid moieties $Z^1$ and $Z^2$ independently have from 12 to 22 carbon atoms.

3. The process according to claim 1 wherein the fatty acid moieties $Z^1$ and $Z^2$ are independently selected from the fatty acid moieties of the group of fatty acids consisting of behenic acid, citronellic acid, decanoic acid, docosanoic acid, 11,14-eicosadienoic acid, eicosanoic acid, cis-11-eicosanoic acid, erucic acid, heptadecanoic acid, isononanoic acid, lauric acid, linoleic acid, linolenic acid, margaric acid, myristic acid, myristoleic acid, neodecanoic acid, nonadecanoic acid, neoheptanoic acid, neononanoic acid, nonanoic acid, octanoic acid, iso-octanoic acid, neo octanoic acid, oleic acid, palmitic acid, palmitoleic acid, pentadecanoic acid, isostearic acid, stearic acid, tridecanoic acid, undecanoic acid and combinations thereof.

4. The process according to claim 1 wherein the fatty acid moieties $Z^1$ and $Z^2$ are independently selected from the fatty acid moieties of the group of fatty acids consisting of linoleic acid, linolenic acid, oleic acid, palmitic acid, stearic acid and combinations thereof.

5. The process according to claim 1 wherein the naphthalimide diol of Formula (II) is:

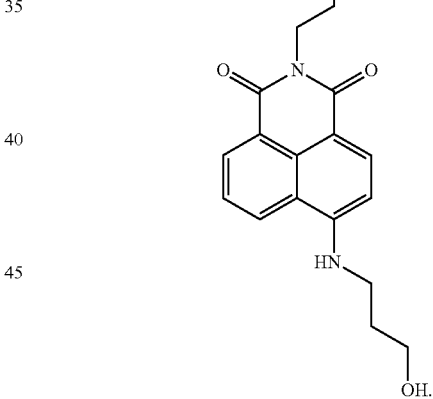

6. The process according to claim 1 wherein R is methyl, ethyl, propyl or combination thereof.

7. The process according to claim 1 wherein the reacting the naphthalimide diol of Formula (II) with the fatty acid ester of Formula (III) is carried out in the presence of a catalyst.

8. The process according to claim 7 wherein the catalyst is sodium hydroxide, calcium oxide, zinc acetate, zinc oxalate, or combination thereof.

9. The process according to claim 7 wherein the catalyst is an organo-tin catalyst.

10. A process for preparing a naphthalimide diester of Formula (I) or mixture thereof,

19

(I)

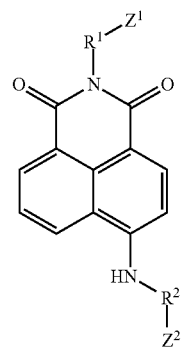

wherein
each of $R^1$ and $R^2$ is, independently of the other, a saturated, linear hydrocarbon chain having from 2 to 10 carbon atoms;
each of $Z^1$ and $Z^2$ is, independently of the other, a fatty acid moiety having a saturated or unsaturated, linear or branched, hydrocarbon chain having from 8 to 24 carbon atoms, and from 0 to 4 double bonds;

the process comprising:
(a) reacting a fatty acid having the formula (IV) or mixture thereof

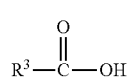
(IV)

wherein $R^3$ is a saturated or unsaturated, linear or branched, hydrocarbon chain having from 8 to 24 carbon atoms, and from 0 to 4 double bonds,
with a molar excess of naphthalimide diol of Formula (II) with respect to said fatty acid, (II)

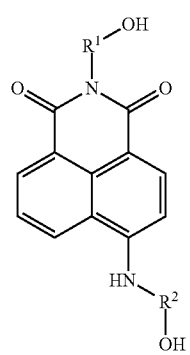

wherein
each of $R^1$ and $R^2$ is, independently of the other, a saturated, linear hydrocarbon chain having from 2 to 10 carbon atoms;
until substantially all of the fatty acid of formula (IV) has been reacted to form a naphthalimide diester of Formula (I); and

20

(b) reacting unreacted naphthalimide diol with an ester of Formula (III) or mixture thereof

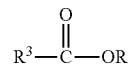
(III)

wherein
R is selected from saturated or unsaturated, linear or branched, hydrocarbon chain having from 1 to 8 carbon atoms and from 0 to 2 double bonds, and phenyl optionally substituted with from 1 to 3 saturated or unsaturated, linear or branched, hydrocarbon chains having from 1 to 6 carbon atoms and from 0 to 2 double bonds; and
$R^3$ is a saturated or unsaturated, linear or branched, hydrocarbon chain having from 8 to 24 carbon atoms, and from 0 to 4 double bonds,
to form additional compound of Formula (I) or mixture thereof.

11. The process according to claim 10 wherein the hydrocarbon chains of the fatty acid moieties $Z^1$ and $Z^2$ independently have from 12 to 22 carbon atoms.

12. The process according to claim 10 wherein the fatty acid moieties $Z^1$ and $Z^2$ are independently selected from the fatty acid moieties of the group of fatty acids consisting of behenic acid, citronellic acid, decanoic acid, docosanoic acid, 11,14-eicosadienoic acid, eicosanoic acid, cis-11-eicosanoic acid, erucic acid, heptadecanoic acid, isononanoic acid, lauric acid, linoleic acid, linolenic acid, margaric acid, myristic acid, myristoleic acid, neodecanoic acid, nonadecanoic acid, neoheptanoic acid, neononanoic acid, nonanoic acid, octanoic acid, iso-octanoic acid, neo octanoic acid, oleic acid, palmitic acid, palmitoleic acid, pentadecanoic acid, isostearic acid, stearic acid, tridecanoic acid, undecanoic acid and combinations thereof.

13. The process according to claim 10 wherein the fatty acid moieties $Z^1$ and $Z^2$ are independently selected from the fatty acid moieties of the group of fatty acids consisting of linoleic acid, linolenic acid, oleic acid, palmitic acid, stearic acid and combinations thereof.

14. The process according to claim 10 wherein the naphthalimide diol of Formula (II) is:

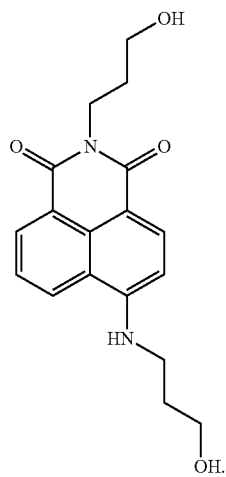 [SMILES: O=C1c2cccc3c(NCCCO)ccc(c23)C(=O)N1CCCO]

15. The process according to claim 10 wherein R is methyl, ethyl, propyl or combination thereof.

16. The process according to claim 10 wherein reacting the naphthalimide diol of Formula (II) with the fatty acid of Formula (IV) in (a) and reacting naphthalimide diol with an ester of Formula (III) in (b) are carried out in the presence of a catalyst.

17. The process according to claim 16 wherein the catalyst is sodium hydroxide, calcium oxide, zinc acetate, zinc oxalate, or combination thereof.

18. The process according to claim 16 wherein the catalyst is an organo-tin catalyst.

19. A composition comprising a naphthalimide diester of Formula (I) or mixture thereof,

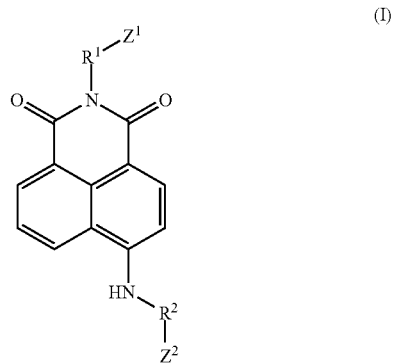

(I)

wherein
each of $R^1$ and $R^2$ is, independently of the other, a saturated, linear hydrocarbon chain having from 2 to 10 carbon atoms; and
each of $Z^1$ and $Z^2$ is, independently of the other, a fatty acid moiety having a saturated or unsaturated, linear or branched, hydrocarbon chain having from 8 to 24 carbon atoms, and from 0 to 4 double bonds;
the composition having an acid value according to ASTM D664-11ae1 of about 2 mg/g KOH or less.

20. The composition according to claim 19 wherein the hydrocarbon chains of the fatty acid moieties $Z^1$ and $Z^2$ of the compound of Formula (I) independently have from 12 to 22 carbon atoms.

21. The composition according to claim 19 wherein the fatty acid moieties $Z^1$ and $Z^2$ of the compound of Formula (I) are independently selected from the fatty acid moieties of the group of fatty acids consisting of behenic acid, citronellic acid, decanoic acid, docosanoic acid, 11,14-eicosadienoic acid, eicosanoic acid, cis-11-eicosanoic acid, erucic acid, heptadecanoic acid, isononanoic acid, lauric acid, linoleic acid, linolenic acid, margaric acid, myristic acid, myristoleic acid, neodecanoic acid, nonadecanoic acid, neoheptanoic acid, neononanoic acid, nonanoic acid, octanoic acid, iso-octanoic acid, neo octanoic acid, oleic acid, palmitic acid, palmitoleic acid, pentadecanoic acid, isostearic acid, stearic acid, tridecanoic acid, undecanoic acid and combinations thereof.

22. The composition according to claim 19 wherein the fatty acid moieties $Z^1$ and $Z^2$ of the compound of Formula (I) are independently selected from the fatty acid moieties of the group of fatty acids consisting of linoleic acid, linolenic acid, oleic acid, palmitic acid, stearic acid and combinations thereof.

23. The composition according to claim 19 having an acid value according to ASTM D664-11ae1 of about 1 mg/g KOH or less.

24. The composition according to claim 19 having an acid value according to ASTM D664-11ae1 of about 0.5 mg/g KOH or less.

25. The composition according to claim 24 having an acid value according to ASTM D664-11ae1 of about 0.1 mg/g KOH or less.

26. The composition according to claim 19 which comprises no more than about 2 mol % alcohol.

27. The composition according to claim 19 comprising a carrier.

* * * * *